United States Patent [19]

Halpaap et al.

[11] 4,235,716

[45] Nov. 25, 1980

[54] FLUORESCENT INDICATORS FOR CHROMATOGRAPHY AND SORPTION AGENTS CONTAINING THEM

[75] Inventors: Herbert Halpaap, Seeheim-Jugenheim; Manfred Eckle, Püttlingen; Hubert Rössler, Darmstadt, all of Fed. Rep. of Germany

[73] Assignee: Merck Patent Gesellschaft mit beschränkter Haftung, Darmstadt, Fed. Rep. of Germany

[21] Appl. No.: 961,824

[22] Filed: Nov. 17, 1978

[30] Foreign Application Priority Data

Apr. 17, 1978 [DE] Fed. Rep. of Germany ....... 2816574

[51] Int. Cl.$^3$ ...................... B01D 15/08; B01J 23/02; B01J 23/06; B01J 23/30
[52] U.S. Cl. .............................. 210/31 C; 210/198 C; 252/457; 252/468
[58] Field of Search ............ 252/457, 465, 468, 301.5; 210/31 C, 198 C, 198 P

[56] References Cited

U.S. PATENT DOCUMENTS

| | | | |
|---|---|---|---|
| 2,182,860 | 12/1939 | Addink et al. | 252/301.5 X |
| 2,632,739 | 3/1953 | Dinwiddie et al. | 252/465 |
| 3,644,734 | 2/1972 | Inoue et al. | 210/198 P |
| 4,115,312 | 9/1978 | Engel et al. | 106/301 X |

FOREIGN PATENT DOCUMENTS 564946 10/1944 United Kingdom ................. 252/301.5

*Primary Examiner*—W. J. Shine
*Attorney, Agent, or Firm*—Millen & White

[57] ABSTRACT

Magnesium, calcium, strontium, barium, zinc and/or cadmium tungstate and/or calcium molybdate are good fluorescent indicators for use in sorption agents for chromatography. They are especially useful because of the stability of their fluorescent properties to acidic treatment.

8 Claims, No Drawings

FLUORESCENT INDICATORS FOR CHROMATOGRAPHY AND SORPTION AGENTS CONTAINING THEM

BACKGROUND OF THE INVENTION

The present invention concerns the use of acid-stable fluorescent indicators in sorption agents for chromatography.

Sorption materials for chromatography are available as finished preparations already applied in thin layers on inert carrier materials. They are also available in loose form for user preparation of the final separating materials. Such sorption materials in many cases contain fluorescent indicators which, when irradiated with UV radiation, enable recognition of the substances separated in the developed chromatogram. In comparison with direct coloring of the chromatogram using special reagents, this method has the advantage that the separated substances can be made visible without change or even destruction of their structure. Destruction-free detection is especially necessary in preparative chromatographic methods. Furthermore, in multiple development chromatography, it is also of great advantage.

Hitherto, the indicator generally employed for this purpose has been a zinc silicate activated with manganese. However, it possesses a serious disadvantage in that its fluorescence is more or less strongly or even fully extinguished when it is treated with an acid. The severity of this deleterious effect depends upon the strength and concentration of the acid. This is a considerable disadvantage since, in many cases, acids are employed in the development of chromatograms, or, often, the sorbent layers are conditioned in an acidic atmosphere or impregnated with acids before the chromatography.

Calcium tungstate is used in large amounts as a fluorescent material for X-ray intensifying foils. Moreover, cadmium tungstate has also been suggested for this purpose. See U.S. Pat. No. 4,115,312.

Although these substances have been known for several decades, and it is also known that they are capable of visible fluorescence, none of these substances has ever been used in sorbents for chromatography.

SUMMARY OF THE INVENTION

Accordingly, it is an object of this invention to provide fluorescent indicators which are suitable for incorporation into sorbents for chromatography; are therefore practically insoluble in conventional elution agents; are stable, especially against acids; and possess a fluorescence sufficiently strong to be easily observed with the eye.

Upon further study of the specification and appended claims, further objects and advantages of this invention will become apparent to those skilled in the art.

These objects have been attained by providing sorption agents for chromatography comprising magnesium, calcium, strontium, barium, zinc and/or cadmium tungstate and/or calcium molybdate as acid-stable fluorescent indicators. The use of magnesium tungstate is preferred.

This invention also provides a method for preparing sorption agents for chromatography which can be analyzed by UV irradiation of a developed chromatogram, which comprises incorporating the fluorescent indicators of this invention in the sorption agents.

The invention further provides chromatographic plates comprising a layer of the sorption agent of this invention.

DETAILED DISCUSSION

Thus, it has been found that the tungstages of magnesium, calcium, strontium, barium, zinc and cadmium and calcium molybdate satisfy all the above-mentioned requirements for sorption agents. Moreover, these salts can be very readily incorporated, as acid-stable fluorescent indicators, into the conventional sorbents for chromatography without any attendant demixing phenomena. This is quite surprising in view of the high specific weights of these indicators which would lead a skilled worker to expect that such inhomogeneities would be likely. Such an effect, if it had occurred, would be highly undesirable since it would lead to an inhomogeneous brightness distribution upon UV irradiation.

The main advantage of the indicators of this invention is their acid stability. Because of this property, it is now possible to work with acid-containing elution agents or to activate sorbent layers with acids without destroying the fluorescence of the indicator. In particular, it is now possible to carry out chemical reactions in acidic media on finished preparations such as, e.g., thin layer plates or foils, the sorption layers of which contain an indicator of this invention.

Therefore, another particularly advantageous field of use of the indicators of this invention is provided, inter alia, whenever sorption agents which are modified with silanizing agents are employed. Such a process is described, e.g., in copending U.S. Application Ser. No. 888,595, filed on Mar. 20, 1978. In such sorption agents, hydrochloric acid is formed by reaction of halosilanes with surface OH groups, e.g., of a silica gel. Despite the presence of the formed acid, the fluorescence of the indicators of this invention is fully retained, in contradistinction to the previously used manganese-activated zinc silicate.

The preparation of the indicators of this invention is in accordance with conventional methods by precipitation of the salts, which are sparingly soluble in water, by combining a solution of a particular metal ion with one of a soluble tungstate or molybdate. Such precipitation methods are conventional to skilled artisans. It is similarly well known how to control the purity and crystal form of the precipitated indicators by the choice of precipitation conditions, such as temperature, concentration, rate of combination, mechanical movement and the like. A precise description of such precipitation processes for each of the mentioned substances can be found, e.g., in Volumes 53 and 54 of Gmelin, Handbuch der Anorganischen Chemie.

The salts isolated from the precipitation solutions are, as a rule, subsequently subjected to activation by a heat treatment at an elevated temperature, e.g., at about 400°–1200° C. for from a few minutes up to 5–6 hours. Such conventional activation treatments are also described e.g. in U.S. Pat. No. 4,115,312.

In principle, the indicators can be employed directly as they are formed in either the precipitation or activation processes. However, in order to achieve as homogeneous a distribution as possible of the indicators in the sorbent and, correspondingly, as homogeneous a brightness density as possible, it is preferred to adapt the degree of fineness of the indicators to the particular sorbent used. Thus, generally, indicators of an average particle size of about 2 to about 20 μm are preferred.

When using sorbents of very fine particle sizes, indicators also of very fine particle sizes are generally preferred. For sorbents which are suitable for HPTLC, particle sizes of about 2–3 μm are preferred. By particle size in the foregoing, there is meant the average particle size ($d_{50}$ value).

Achievement of suitable particle sizes for the indicators can be accomplished in various conventional ways. Thus, e.g., as mentioned above, the particle size can be substantially predetermined during precipitation and activation by choice of suitable conditions. However, the indicators can also be prepared in a suitable particle size by subsequent sedimentation, air sifting, grinding or other conventional techniques.

Because of their sparing solubility and chemical inertness, the indicators of this invention are suitable for incorporation into all conventional sorbents, e.g., the most varied types of silica gel, especially also surface-modified silica gels, kieselguhr, the various types of aluminum oxides, magnesium silicates and also organic sorbents, such as cellulose or polyamides. The selection of the properties of such sorbents and the manner in which they are prepared and employed as well as all other details of their use in chromatography is in accordance with fully conventional procedures unless otherwise indicated herein. Such conventional details are disclosed, e.g., in Dünnschichtchromatographie; Egon Stahl; Springer Verlag, Berlin, Heidelberg, New York; 2$^{nd}$ Edition, 1967.

The indicators of this invention are, as a rule, admixed with the sorbents in amounts of about 0.5 to about 10%, preferably of about 2%, based on the amount of sorbent. A desired fluorescence color can be selected by suitable choice of indicator or combination of indicators of this invention. Thus, e.g., cadmium tungstate displays a yellow-green fluorescence which is very good to observe visually. The fluorescence of calcium molybdate also lies in this wavelength range. On the other hand, the preferably employed magnesium tungstate displays an ashy blue fluorescence, whereby UV-absorbing substances appear deep dark blue to black in the chromatogram.

The incorporation of the fluorescence indicators into the sorbents is achieved using fully conventional standard processes, e.g., those employed in conjunction with manganese activated zinc silicate. In this conventional method it is preferred that the indicator is first mixed with only a part, e.g. 10% of the whole amount, of the sorbent, and thereafter the remaining part of the sorbent is blended with this premixture. This method helps to achieve a very homogeneous distribution of the indicator in the sorbent. In the same way a homogeneous mixture of binder and sorbent is achieved.

In a preferred mode about 100 parts of a mixture, prepared according to the method described in the preceding paragraph, of 93-98% of sorbent (e.g., a silica gel of average pore size), of 1-3% of fluorescent indicator of this invention and of 1-3% of binding agent (e.g., sodium polyacrylate and sodium polymethacrylate) are added to 200-400 parts of desalinated water with intensive stirring in order to homogenize the blend. After removal of air, the resultant suspension is conventionally coated onto an appropriate substrate. By this method sorbent layers with a homogeneous indicator distribution and thus a homogeneous brightness distribution are achieved.

The indicators of this invention can also be used as mixtures with one another or also as mixtures with other fluorescent indicators. For example, an indicator mixture consisting of equal parts of magnesium tungstate and of manganese-activated zinc silicate can be used. When a chromatogram obtained using such a mixture is developed in a neutral or alkaline medium, the green fluorescence of the zinc silicate can be observed above all. If, on the other hand, due to development in an acidic medium or other action of acids, the fluorescence of the zinc silicate is destroyed, the ashy blue fluorescence of the magnesium tungstate will be observed. Therefore, such a mixture offers considerable advantages.

The sorbents containing the indicators of this invention can be marketed as such. They can then be employed by the user in the preparation of plates for thin layer or preparative layer chromatography, or can be employed for column, especially dry column, chromatography. However, as a rule, the sorbents are marketed in the ready to use form of thin layers on glass plates, synthetic resins or aluminum foils. As a rule, these finished preparations also contain binding agents or additives which increase the adhesion of the layers to the substrates. Especially suitable binding agents are, e.g., the binding agents described in German Pat. Specification Nos. 1,442,446 and 1,517,929.

The sensitivity of detection which is achieved using the indicators of this invention is comparable to that which is achievable with manganese-activated zinc silicate. The excitation preferably takes place in the short-wave UV range, e.g., with lamps which emit in the wavelength range of 254 nm, i.e., 248–366 nm.

The methods of chromatogram analysis employable with this invention are fully conventional, e.g., those employed with magnesium containing zinc silicate indicators, can be used.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLES

Examples of the Preparation of the Sorbents and Chromatographic Substrates of this Invention

EXAMPLE 1

To 240 liters of desalinated water are added, with intensive stirring, 100 kg of a mixture of 96.5% of an average-pored silica gel (specific surface area 500 m$^2$/g; pore volume 0.75 ml/g; pore width 6 nm; average particle size $d_{50}$32 10.5 μm), 1.5% of magnesium tungstate as fluorescent indicator (average particle size ($d_{50}$)—about 5 μm) and 2% of binding agent (sodium polyacrylate). After complete homogenization of the mass and removal of air, these are coated in a coating apparatus.

(a) glass plates of a size, 200 mm × 200 mm × 1.2 mm and
(b) terephthalate foils, pretreated with polymeric TiO$_2$, 200 mm wide and 0.2 mm thick.

These are subsequently dried in a drying channel. After drying, the layer thickness is 250 μm for (a) and 200 μm for (b).

EXAMPLE 2

To 26 liters of desalinated water are added, after intensive stirring, 10 kg of a mixture of 96% of an average pored silica gel (specific surface area 400 m$^2$/g; pore volume 1.0 ml/g; pore width 10 nm; average particle size ($d_{50}$)=0.5 μm), 2% of magnesium tungstate as fluorescent indicator (average particle size ($d_{50}$) about 2 μm) and 2% of binding agent (sodium polymethacrylate). After complete homogenization of the mass and removal of air, glass plates of the size 200 mm×200 mm×1.2 mm are coated in a coating plant and subsequently dried in a drying channel. After drying, the layer thickness is 200 μm.

EXAMPLE 3

To 24 liters of desalinated water are gradually added, with intensive stirring, 10 kg of a mixture of 96.5% of an average-pored silica gel (specific surface area 500 m$^2$/g, pore volume 0.75 ml/g; pore width 6 nm; average particle size ($d_{50}$)—18 μm), 1.5% of cadmium tungstate as fluorescent indicator (average particle size ($d_{50}$) about 7 μm) and 2% of binding agent (sodium polyacrylate+sodium polymethacrylate 1:1). After complete homogenization of the mass and removal of air, glass plates of the size 200 mm×200 mm×1.2 mm are coated in a coating plant and subsequently dried, initially for several hours in air, then at elevated temperature (e.g., about 80° C.). After drying, the layer thickness is 1 mm.

EXAMPLE 4

(a) To 24 liters of desalinated water are added, with intensive stirring, 10 kg of a mixture of 96% of an average-pored silica gel (specific surface area 500 m$^2$/g; pore volume 0.75 ml/g; pore width 6 nm; average particle size $d_{50}$=21 μm), 2% of magnesium tungstate as fluorescent indicator (average particle size ($d_{50}$) about 10 μm) and 2% of binding agent (sodium polyacrylate).

(b) To 3.9 liters of desalinated water are gradually added, with intensive stirring, 1.5 kg of a mixture of 96% of silicon dioxide (specific surface area 0.6 m$^2$/g; pore volume 0.7 ml/g; pore width about 5000 nm), 2% of magnesium tungstate as fluorescent indicator (average particle size ($d_{50}$) about 4.5 μm) and 2% of binding agent (sodium polyacrylate).

After complete homogenization of the two suspensions and removal of air, glass plates of the format 200 mm× 200 mm×1.2 mm are coated in a coating plant in such a manner that a layer of 160 mm in breadth resulting from suspension (a) borders directly onto a layer of 40 mm in breadth obtained from suspension (b). The coating plate is so adjusted that, after drying, there result layer thicknesses of 2 mm for the chromatography layer (a) and of 1.2 mm for the concentration zone (from suspension b). (See copending United States Application Ser. No. 909,591, filed on May 25, 1978, now U.S. Pat. No. 4,158,626.) The drying of the plates takes place initially for several hours in air, then at elevated temperature (e.g., 80° C.).

EXAMPLE 5

98 g of microcrystalline cellulose (narrow diameter—6 μm; WASP method) and 2 g of magnesium tungstate (average particle size ($d_{50}$) about 2 μm) are beaten up with 400 ml of desalinated water in a mixing device for 2 minutes at a high speed of rotation. After removal of air by evacuation, glass plates of the size 200 mm×200 mm×1.2 mm are coated in a conventional coating plant and subsequently dried in a drying channel. After drying, the layer thickness is 100 μm.

EXAMPLE 6

Analogously to Example 2, glass plates are coated with a suspension which, as fluorescent indicator, contains 1.5% of calcium tungstate and 1.5% of calcium molybdate, both salts with an average particle size ($d_{50}$) of about 3 μm.

EXAMPLE 7

Analogously to Example 2, glass plates are coated with a suspension which, as fluorescent indicator, contains a mixture of manganese-activated zinc silicate and magnesium tungstate in the weight ratio of 1:1. Both salts possess an average particle size ($d_{50}$) of about 3 μm.

Examples of the Use of the Sorbents of the Invention

EXAMPLE 8

A TLC plastic foil silica gel (50 m×200 mm) produced according to Example 1 is, using separators, rolled up in such a manner that, between the individual windings, there exists a distance of at least 1 mm. The roll is dipped for 30 minutes in a 10 wt.% solution of methyloctyldichlorosilane in toluene; dried in air for 1 hour; and then again dipped in. Thereafter, it is successively washed three times with toluene, with dichloromethane/methanol (1:1) and with acetone/water (1:1) and dried. In the case of the separation of a steroid-containing test solution, it is found that, in contradistinction to a conventional foil provided with manganese-activated zinc silicate as fluorescent indicator, the indicator action (reduction of fluorescence of the UV-absorbing substances on the layer) is fully maintained.

EXAMPLE 9

Into a trough which contains 20 liters of a 10 wt.% solution of methyloctadecyldichlorosilane in toluene, there is dipped a plate holder with 50 TLC finished plates produced according to Example 2. It is then dried in air for 1 hour and again dipped in. Thereafter, it is successively washed, in each case three times, with toluene, with dichloromethane/methanol and with acetone/water and then dried. The plates obtained can be used directly for the reversed phase thin layer chromatography.

For the conventional detection under UV light of a developed chromatogram, it is found that, in contradistinction to the usual manganese-activated zinc silicate, for plates having a magnesium tungstate indicator, the indicator action (reduction of fluorescence of UV-absorbing substances on the layer) is fully maintained.

EXAMPLE 10

For the determination of water-soluble sulphonic acid group-containing steroids, the TLC finished plates produced according to Example 1 are developed with methanol/10% hydrochloric acid (volume ratio 90/10) up to a running height of the elution agent of 100 mm. All UV-absorbing substances are clearly recognizable in the short wavelength UV (254 nm) by extinction of fluorescence. For a plate which contains manganese-activated zinc silicate as fluorescent indicator, under the same experimental conditions, the fluorescence is destroyed up to a height of 60 mm; all substances with $R_f$ values below 0.6 are, thus, no longer detectable by extinction of fluorescence.

EXAMPLE 11

A solution which contains various aniline-sulphonic acids is applied to a plastic foil produced according to Example 1 for chromatographic separation. After chromatographic development, the plastic foil is sprayed with the universal detection reagent methanol/5% perchloric acid (volume ratio 90/10) and, after drying, is heated for 5 minutes at 110° C. New fluorescing substances are recognizable in the long wavelength UV but, in addition, substances in the short wavelength UV are also detectable. In contradistinction to a plate which contains activated zinc silicate as fluorescent indicator, the UV fluorescence is not destroyed by the acid action.

EXAMPLE 12

Some of the plates produced according to Example 2 are impregnated before the chromatography by dipping in methanol/2% hydrochloric acid (volume ratio 90/10), and then are dried. The applied UV-absorbing sulphonic acid group-containing steroids, are, after development in chloroform/methanol (1:1), visible in short wavelength UV by extinction of fluorescence. When similarly using manganese-activated zinc silicate as fluorescent indicator, on the other hand, due to the acid action, under the same conditions the UV fluorescence is destroyed.

EXAMPLE 13

On a plate having a concentrating zone produced according to Example 4, a mixture of hydrophilic plant content materials absorbing in the UV is developed with butanol/formic acid/water (volume ratio 75/15/10). In contradistinction to layers containing manganese-activated zinc silicate, all UV-absorbing substances are clearly recognizable on the layer.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without deparing from the spirit and scope thereof, can make various changes and modifications of the invention to adapt it to various usages and conditions.

What is claimed is:
1. A sorption agent for chromatography comprising a sorbent and a tungstate of magnesium, calcium, strontium, barium, zinc or cadmium, or calcium molybdate as a fluorescent indicator, the amount of indicator being 0.5–10% of the amount of sorbent.
2. The sorption agent of claim 1, wherein the particle sizes of the indicator salts are about 2–20 μm.
3. The sorption agent of claim 1, wherein the sorbent is modified with a silanizing agent.
4. The sorption agent of claim 1, wherein the indicator is prepared by activation of said tungstate or molybdate salt by heat treatment at 400°–1200° C.
5. A chromatographic plate or foil containing a layer of the sorption agent of claim 1.
6. A method of preparing acid stable sorption agents for chromatography which can be analyzed by UV irradiation after they are developed, which comprises incorporating therein as a fluorescent indicator a tungstate of magnesium, calcium, strontium, barium, zinc or cadmium, or calcium molybdate.
7. The method of claim 6, wherein the indicator has a particle size of about 2–20 μm.
8. A method of performing chromatography wherein the sorption agent is exposed to acid conditions prior to analysis by UV irradiation, which comprises employing as the sorption agent, the sorption agent of claim 1.

* * * * *